US009967597B2

United States Patent
Kirksey

(10) Patent No.: US 9,967,597 B2
(45) Date of Patent: *May 8, 2018

(54) TRANSMITTING A PRIORITIZED AUDIO STREAM ALONG WITH MULTIMEDIA CONTENT

(71) Applicant: AT&T INTELLECTUAL PROPERTY I, L.P., Atlanta, GA (US)

(72) Inventor: Michael Kirksey, Forney, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/363,063

(22) Filed: Nov. 29, 2016

(65) Prior Publication Data

US 2017/0078708 A1     Mar. 16, 2017

Related U.S. Application Data

(63) Continuation of application No. 14/845,672, filed on Sep. 4, 2015, now Pat. No. 9,538,213, which is a
(Continued)

(51) Int. Cl.

| H04N 21/233 | (2011.01) |
| H04N 21/2368 | (2011.01) |
| H04N 21/2665 | (2011.01) |
| H04N 21/643 | (2011.01) |
| H04N 5/04 | (2006.01) |
| H04N 21/242 | (2011.01) |
| H04N 21/43 | (2011.01) |

(Continued)

(52) U.S. Cl.
CPC ............ *H04N 21/233* (2013.01); *H04N 5/04* (2013.01); *H04N 21/2368* (2013.01); *H04N 21/242* (2013.01); *H04N 21/2665* (2013.01); *H04N 21/4307* (2013.01); *H04N 21/4394* (2013.01); *H04N 21/6334* (2013.01); *H04N 21/64322* (2013.01)

(58) Field of Classification Search
CPC ...................... H04N 21/2368; H04N 21/2665
See application file for complete search history.

(56) References Cited

U.S. PATENT DOCUMENTS

| 5,961,603 A | 10/1999 | Kunkel et al. |
| 6,128,649 A | 10/2000 | Smith et al. |

(Continued)

FOREIGN PATENT DOCUMENTS

WO     2004075565 A1    9/2004

OTHER PUBLICATIONS

Murph, D., "The Dark Knight Fan Commentary BD-Live Feature Shown on Video", Engadget, Dec. 9, 2008, Retrieved from http://www.engadget.com/2008/12/09/the-dark-knight-fan-commentary-bd-live-feature-shown-on-video/, 1 page.

*Primary Examiner* — Joe Chacko
(74) *Attorney, Agent, or Firm* — Toler Law Gourp, PC

(57) ABSTRACT

A method includes generating, at a server, a composite stream that includes a first packet and a second packet. The first packet includes first data associated with a video stream and a native audio stream from a first content source. The second packet includes second data corresponding to a first audio stream from a second content source. The method also includes initiating a transmission of the composite stream to a media device.

20 Claims, 5 Drawing Sheets

Related U.S. Application Data continuation of application No. 12/565,826, filed on Sep. 24, 2009, now Pat. No. 9,185,445.

(51) Int. Cl.
*H04N 21/439* (2011.01)
*H04N 21/6334* (2011.01)

(56) References Cited

U.S. PATENT DOCUMENTS

| | | |
|---|---|---|
| 6,223,292 B1 | 4/2001 | Dean et al. |
| 6,493,872 B1 | 12/2002 | Rangan et al. |
| 6,829,781 B1 | 12/2004 | Bhagavath et al. |
| 7,020,888 B2 | 3/2006 | Reynolds et al. |
| 7,142,250 B1 | 11/2006 | Black |
| 7,158,676 B1 | 1/2007 | Rainsford |
| 7,360,160 B2 | 4/2008 | Matz |
| 7,904,814 B2 | 3/2011 | Errico et al. |
| 8,286,218 B2 | 10/2012 | Pizzurro et al. |
| 2001/0026591 A1 | 10/2001 | Keren et al. |
| 2002/0111993 A1* | 8/2002 | Reed .................... G06Q 20/401 709/203 |
| 2005/0019015 A1 | 1/2005 | Ackley et al. |
| 2005/0062843 A1 | 3/2005 | Bowers et al. |
| 2006/0123063 A1 | 6/2006 | Ryan et al. |
| 2006/0156374 A1* | 7/2006 | Hu ........................ H04N 7/163 725/135 |
| 2007/0039032 A1 | 2/2007 | Goldey et al. |
| 2007/0116297 A1 | 5/2007 | Mishra |
| 2007/0266168 A1 | 11/2007 | Sampat et al. |
| 2007/0294737 A1 | 12/2007 | Edwards et al. |
| 2007/0297454 A1 | 12/2007 | Brothers |
| 2007/0299983 A1* | 12/2007 | Brothers ............... H04N 21/233 709/231 |
| 2008/0098450 A1 | 4/2008 | Wu et al. |
| 2008/0320525 A1* | 12/2008 | Smith ................ H04N 5/44513 725/61 |

\* cited by examiner ived by the user interface 114 also includes user designations of prioritized audio streams, as described herein.
TRANSMITTING A PRIORITIZED AUDIO STREAM ALONG WITH MULTIMEDIA CONTENT

CLAIM OF PRIORITY

The present application claims priority from, and is a continuation application of, U.S. patent application Ser. No. 14/845,672, filed Sep. 4, 2015, which is a continuation of U.S. patent application Ser. No. 12/565,826, filed Sep. 24, 2009, now U.S. Pat. No. 9,185,445, each of which is hereby incorporated by reference in its entirety.

FIELD OF THE DISCLOSURE

The present disclosure is generally related to transmitting audio streams and multimedia content.

BACKGROUND

Advances in broadcasting and entertainment technology have made it possible to simultaneously experience multimedia content from multiple sources. For example, football fans may watch television coverage of a particular game while listening to a local radio broadcast of the game instead of the television commentary. As another example, some automobile racing leagues provide online streaming of in-car comments from drivers. Fans of a particular driver may watch television coverage of a race while listening to driver comments streamed to a computer. However, the television and radio/Internet stream are often out-of-sync, decreasing the overall enjoyment of the multimedia content. Furthermore, a user may have to operate multiple devices (e.g., a television and either a radio receiver or a computer) in order to enjoy the simultaneous broadcasts of content.

DETAILED DESCRIPTION

Systems and methods for transmitting a prioritized audio stream along with multimedia content are disclosed. In a particular embodiment, a method includes receiving a designation of a prioritized audio stream to be transmitted with a broadcast of multimedia content. The designation is received at a server prior to the broadcast. The method also includes retrieving the multimedia content from a first content source and retrieving the prioritized audio stream from a second content source. The first content source and the second content source are each external to the server. The prioritized audio stream is added to the multimedia content to form a composite content stream. The method further includes initiating a broadcast of the composite content stream.

In another particular embodiment, a set-top box includes an input interface to receive a user designation of a prioritized audio stream associated with a broadcast of a multimedia content item. The user designation is received prior to receipt of the broadcast multimedia content item. The set-top box also includes a network interface to send the ser designation of the prioritized audio stream to a server and to receive a composite content stream comprising the multimedia content item and the prioritized audio stream from the server. The set-top box further includes an output interface to transmit a signal based on the composite content stream to a multimedia device coupled to the set-top box.

In another particular embodiment, a computer-readable storage medium includes instructions, that when executed by a processor, cause the processor to receive a designation of a prioritized audio stream to be transmitted with multimedia content. The designation is received at a server prior to transmission of the multimedia content. The computer-readable storage medium also includes instructions, that when executed by the processor, cause the processor to retrieve the multimedia content from a first content source and to retrieve the prioritized audio stream from a second content source. The first content source and the second content source are external to the server. The prioritized audio stream is added to at least a portion of the multimedia content to form a composite content stream. The computer-readable storage medium further includes instructions, that when executed by the processor, cause the processor to transmit the content stream from the server to a destination device via a network.

Figure 1:
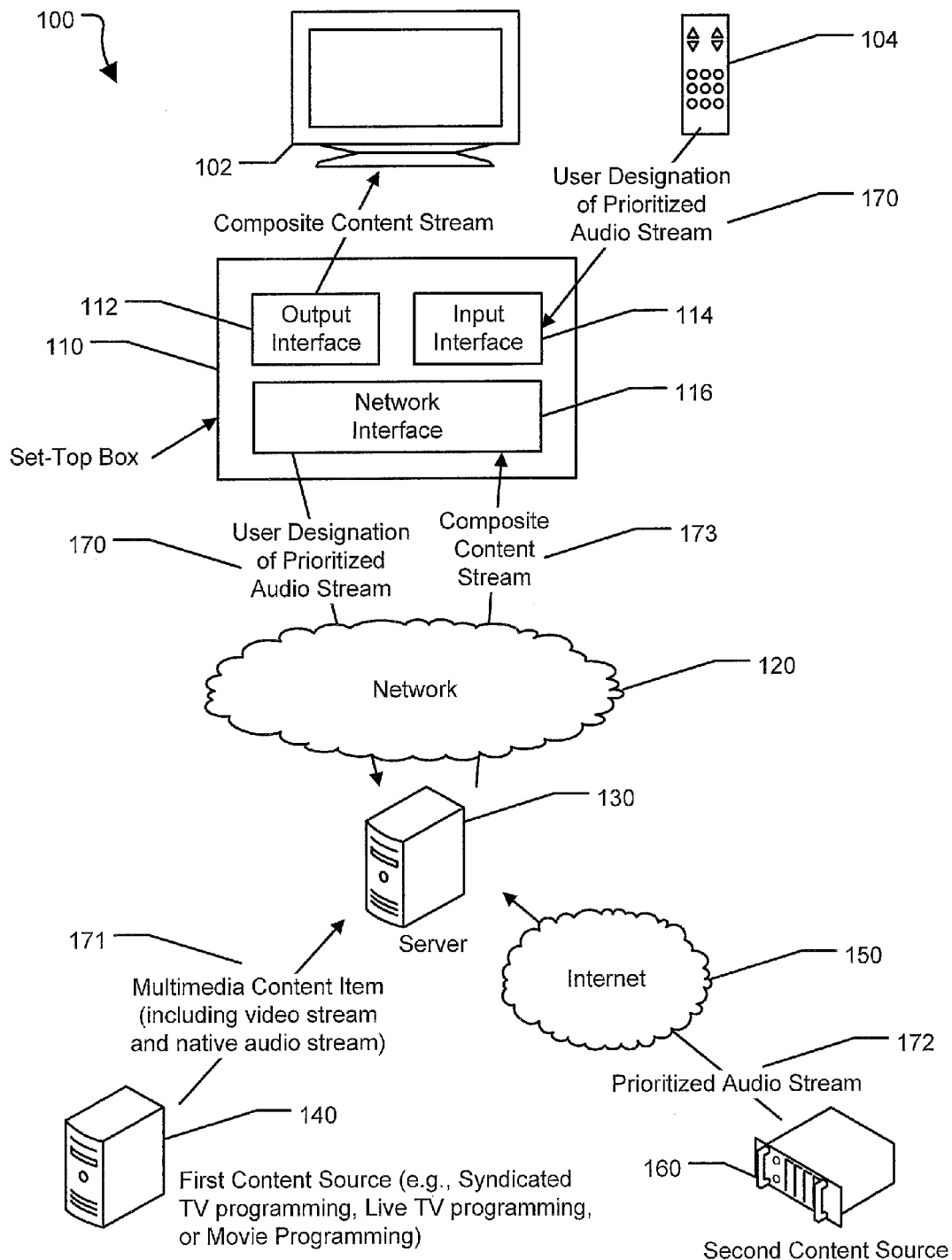
FIG. 1 is a diagram of a particular embodiment of a system of transmitting a prioritized audio stream along with multimedia content.

FIG. 1 depicts a diagram of a particular embodiment of a system 100 of transmitting a prioritized audio stream along with multimedia content. The system 100 includes a server 130 communicatively coupled to a set-top box (STB) 110 via a network 120. The server 130 is also communicatively coupled to a plurality of content sources, such as a first content source 140 and a second content source 160 via the Internet 150. Generally, the system 100 of FIG. 1 may enable a user to designate and receive prioritized audio streams along with multimedia content broadcasts.

The STB 110 includes an input interface 114. In a particular embodiment, the input interface 114 enables user input at the STB 110. For example, the STB 110 may receive user input via the input interface 114 from a remote control 104. User input received by the user interface 114 may include STB controls such as power, volume, and channel, and electronic program guide (EPG) selections. User input received by the user interface 114 also includes user designations of prioritized audio streams, as described herein.

The STB 110 also includes an output interface 112 that enables communication of multimedia content from the STB 110 to a multimedia device such as the display device 102. Multimedia content may include video content, audio content, interactive content, or any combination thereof. In a particular embodiment, the display device 102 is a standard definition television (SDTV), a high definition television (HDTV), or a computer system display.

The STB 110 further includes a network interface 116 configured to send and receive information to and from the server 130 via the network 120. In a particular embodiment, the network 120 is a cable television network, a satellite television network, or an Internet Protocol television (IPTV) network. The network interface 116 is configured to transmit a user designation of a prioritized audio stream 170 to the server 130 via the network 120. The network interface 116 is also configured to receive a composite content stream 173 that includes a multimedia content item 171 and the prioritized audio stream 172 from the server 130 via the network 120.

The server 130 may be a cable television provider server, a satellite television provider server, an IPTV provider server, or some other server. For example, the server 130 may include network interfaces and software modules to enable communication with content sources (e.g., the first content source 140 and the second content source 160 via the Internet 150) and subscriber STBs (e.g., the STB 110 via the network 120). The server 130 may also include one or more memory devices and software modules to enable combination of multimedia content and a prioritized audio stream, as described herein. The server 130 is configured to receive the user designation of a prioritized audio stream 170 from the STB 110, indicating that the prioritized audio stream 172 is to be transmitted along with a future broadcast (e.g., live broadcast, re-broadcast, syndicated broadcast, unicast, or video on demand broadcast) of the multimedia content item 171. The server 130 is also configured to retrieve the multimedia content item 171 (e.g., from a first content source 140) and to retrieve the prioritized audio stream 172 (e.g., from a second content source 160) via the Internet 150. In a particular embodiment, the multimedia content item 171 includes a video stream and a native audio stream.

The server 130 is further configured to combine the multimedia content item 171 and the prioritized audio stream 172 to form a composite content stream 173 for transmission to the STB 110 via the network 120. In a particular embodiment, the composite content stream 173 includes the video stream, the native audio stream, and the prioritized audio stream. In another particular embodiment, the composite content stream 173 includes the video stream and the prioritized audio stream but not the native audio stream, because the server 130 has replaced the native audio stream with the prioritized audio stream 172.

The content sources 140, 160 are external to the server 130. The content sources 140, 160 may provide syndicated television programming, live television programming, movie programming, radio programming, interactive programming, Internet-based content streams, or other types of content. In a particular embodiment, the prioritized audio stream 172 may be a restricted-access prioritized audio stream. For example, access to the prioritized audio stream 172 may be restricted via subscription, pay-per-access, password, or other security measure. In such an embodiment, the STB 110 may transmit an authorization token (e.g., a password received at the input interface 114) to the server 130, where the authorization token enables access to the prioritized audio stream 172. The server 130 may then transmit the authorization token to the second content source 160 prior to retrieving the prioritized audio stream 172 from the second content source 160.

In operation, a user of the STB 110 may designate a prioritized audio stream to be transmitted along with an upcoming broadcast of multimedia content, and the STB 110 may transmit the user designation 170 to the server 130 via the network 120. For example, the server 130 may receive a user designation indicating that Internet radio commentary for an upcoming football game is to be transmitted to the STB 110 along with the television broadcast of the football game.

Once the multimedia content item 171 and the prioritized audio stream 172 are available, the server 130 may retrieve the multimedia content item 171 from the first content source 140 and the prioritized audio stream 172 from the second content source 160. For example, once the football game begins, the server 130 may retrieve the live television broadcast of the football game from the first content source 140 (e.g., a server associated with a television channel carrying the live television broadcast) and may retrieve the Internet radio commentary for the football game from the second content source (e.g., a server associated with a radio station) via the Internet 150. The live television broadcast may include native video (e.g., video captured by television cameras) and native audio (e.g., audio commentary from television announcers). The Internet radio commentary may include local commentary from a radio station affiliated with the home team or the away team.

The server 130 may then combine the multimedia content item 171 and the prioritized audio stream 172 to form the composite content stream 173. For example, the server 130 may combine the live television broadcast and the Internet radio commentary associated with the football game. Forming the composite content stream 173 may include interleaving packets of the multimedia content item 171 and the prioritized audio stream 172, replacing the native audio stream with the prioritized audio stream 172, or any combination thereof. In a particular embodiment, the server 130 synchronizes the multimedia content item 171 and the prioritized audio stream 172 before forming the composite audio stream 173. For example, the server 130 may introduce a delay in the Internet radio commentary in order to synchronize the Internet radio commentary with the live television broadcast. Once formed, the composite content stream 173 may be broadcast to the STB 110, where the composite content stream 173 is processed and signals based on the composite content stream 173 are transmitted to the display device 102 (e.g., an HDTV).

It will be appreciated that the system 100 of FIG. 1 may enable a user to enjoy multimedia content and a prioritized audio stream from a single source. For example, the system 100 of FIG. 1 may enable a user to simultaneously enjoy both a multimedia content item (e.g., a live television broadcast of a football game at a screen of an HDTV) and a prioritized audio stream (e.g., Internet radio commentary emitted from speakers of the HDTV) at a single device (e.g., the HDTV).

It should be noted that although the system 100 of FIG. 1 has been described in the context of Internet radio commentary of a sports event, the prioritized audio stream may be any audio stream. For example, the prioritized audio stream 172 may be a higher or lower quality audio stream than the native audio stream of the multimedia content item 171. As another example, the prioritized audio stream 172 may be in a different language than the native audio stream.

It will also be appreciated that the system 100 of FIG. 1 may enable revenue generation for television providers. For example, a user may be given the option of replacing a standard (e.g., stereo) audio stream associated with multimedia content with a high-quality (e.g. surround sound) prioritized audio stream for a fee. It will further be appreciated that the system 100 of FIG. 1 may enable revenue generation for content providers. For example, a content provider associated with the second content source 160 may charge a pay-per-access fee or subscription fee for access to the prioritized audio stream. Furthermore, because television viewers that otherwise do not have access to the content provider (e.g., out-of-town viewers with respect to a local radio station) may access the prioritized audio stream via the system 100 of FIG. 1, the system 100 of FIG. 1 may increase an available advertising audience of a content provider.

Figure 2:
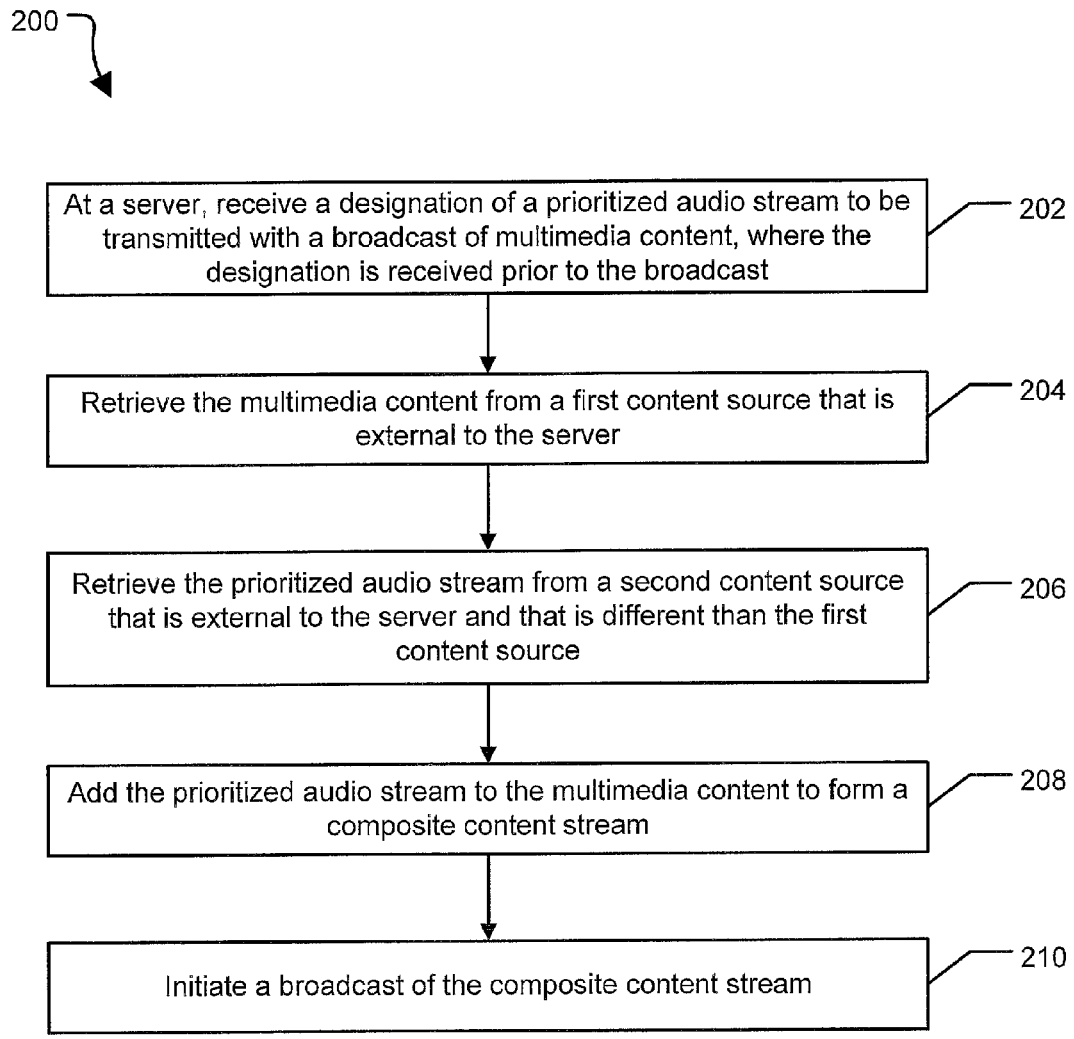
FIG. 2 is a flow diagram of a particular embodiment of a method of transmitting a prioritized audio stream along with multimedia content.

FIG. 2 illustrates a flow diagram of a particular embodiment of a method 200 of transmitting a prioritized audio stream along with multimedia content. In an illustrative embodiment, the method 200 may be performed by the server 130 of FIG. 1.

The method 200 includes receiving a designation of a prioritized audio stream to be transmitted with a broadcast of multimedia content, at 202. The designation is received at a server prior to the broadcast. For example, in FIG. 1, the server 130 may receive the designation of a prioritized audio stream from the STB 110 via the network 120.

The method 200 also includes retrieving the multimedia content from a first content source that is external to the server, at 204. For example, in FIG. 1, the server 130 may retrieve the multimedia content from the first content source 140. The method 200 further includes retrieving the prioritized audio stream from a second content source that is external to the server and that is different than the first content source, at 206. For example, in FIG. 1, the server 130 may retrieve the prioritized audio stream from the second content source 160 via the Internet 150.

The method 200 includes adding the prioritized audio stream to the multimedia content to form a composite content stream, at 208. For example, in FIG. 1, the server 130 may add the prioritized audio stream to the multimedia content to form the composite content stream. The method 200 also includes initiating a broadcast of the composite content stream, at 210. For example, in FIG. 1, the server 130 may initiate a broadcast of the composite content stream by transmitting the composite content stream to the STB 110 via the network 120.

It will be appreciated that by implementing the method 200 of FIG. 2, a server may package and provide both multimedia content and prioritized audio to users via a single composite content stream. In a particular embodiment, the method 200 of FIG. 2 is modified to enable data retrieval from more than two content sources. For example, one or both of the multimedia content and the prioritized audio stream may be formed by combining content from more than one source.

Figure 3:
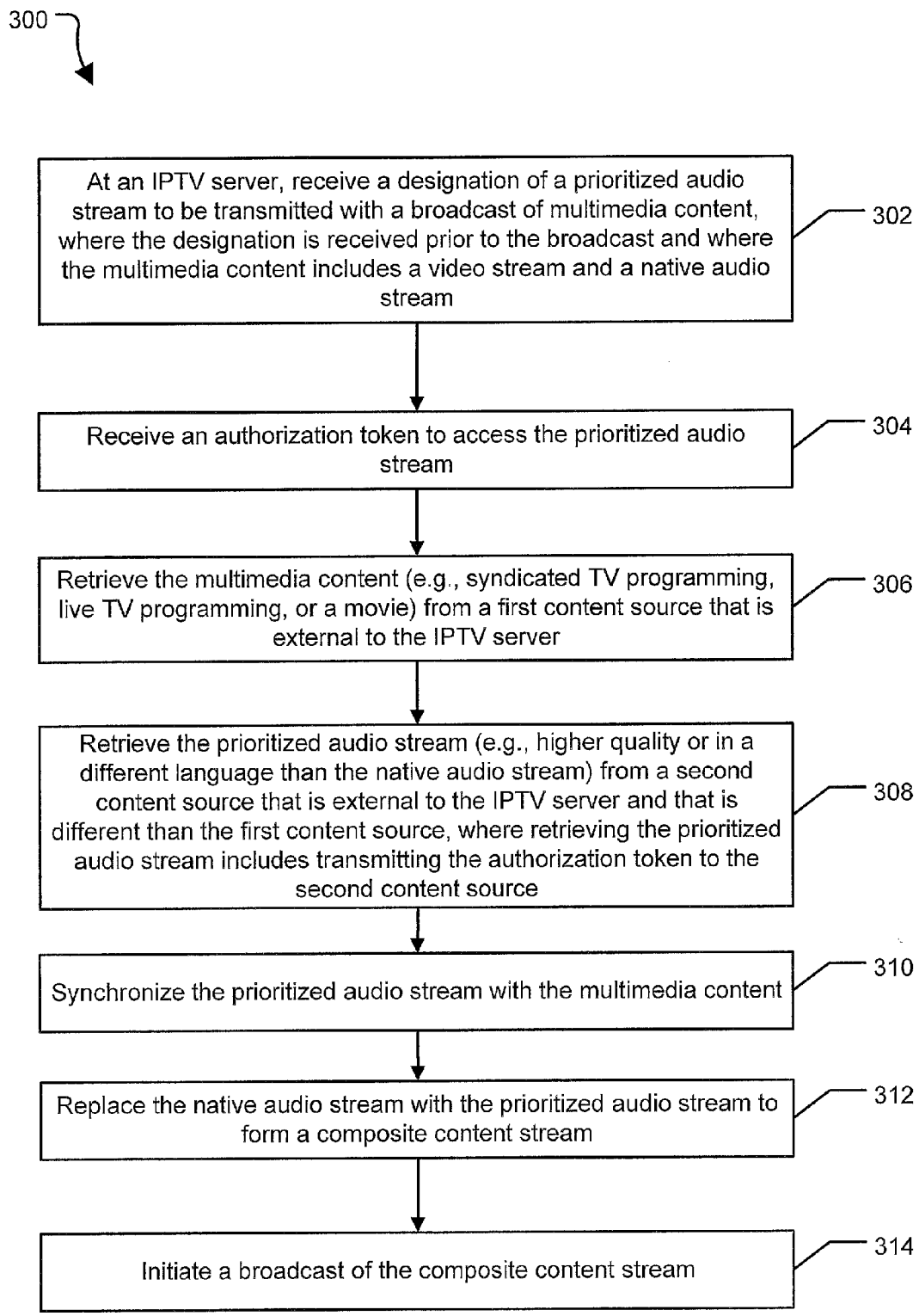
FIG. 3 is a flow diagram of another particular embodiment of a method of transmitting a prioritized audio stream along with multimedia content.

FIG. 3 illustrates a flow diagram of another particular embodiment of a method 300 of transmitting a prioritized audio stream along with multimedia content. In an illustrative embodiment, the method 300 may be performed by the server 130 of FIG. 3.

The method 300 includes receiving a designation of a prioritized audio stream to be transmitted with a broadcast of multimedia content, at 302. The designation is received at a server (e.g., an IPTV server) prior to the broadcast. The multimedia content includes a video stream and a native audio stream. For example, referring to FIG. 1, the server 130 may receive a user designation of the prioritized audio stream from the STB 110 via the network 120.

The method 300 also includes receiving an authorization token to access the prioritized audio stream, at 304. For example, referring to FIG. 1, the server 130 may receive a password that enables access to the prioritized audio stream. The method 300 further includes retrieving the multimedia content from a first content source that is external to the server, at 306. The multimedia content may include syndicated television programming, live television programming, video on demand programming, or a movie. For example, referring to FIG. 1, the server 130 may retrieve the multimedia content from the first content source 140.

The method 300 further includes retrieving the prioritized audio stream from a second content source that is external to the server and that is different than the first content source, at 308. Retrieving the prioritized audio stream includes transmitting the authorization token to the second content source. For example, referring to FIG. 1, the server 130 may transmit the password to the second content source 160 and may retrieve the prioritized audio stream from the second content source 160.

The method 300 includes synchronizing the prioritized audio stream with the multimedia content, at 310, and replacing the native audio stream with the prioritized audio stream to form a composite content stream, at 312. For example, referring to FIG. 1, the server 130 may synchronize the prioritized audio stream with the multimedia content (e.g., by delaying one or both of the prioritized audio stream and the multimedia content) and replace the native audio stream of the multimedia content with the prioritized audio stream, thereby forming the composite content stream.

The method 300 also includes initiating a broadcast of the composite content stream, at 314. For example, referring to FIG. 1, the server 130 may initiate broadcast of the composite content stream by transmitting the composite content stream to the STB 110 via the network 120.

It will be appreciated that the method 300 of FIG. 3 may enable servers to provide multimedia content and prioritized audio via a single composite content stream (e.g., a composite IPTV stream), including access-restricted prioritized audio. It will also be appreciated that the method 300 of FIG. 3 may enable a server to synchronize the multimedia content with the prioritized audio, so that the composite content stream does not include out-of-sync problems experienced by users who attempt to enjoy multimedia content and prioritized audio via separate devices.

Figure 4:
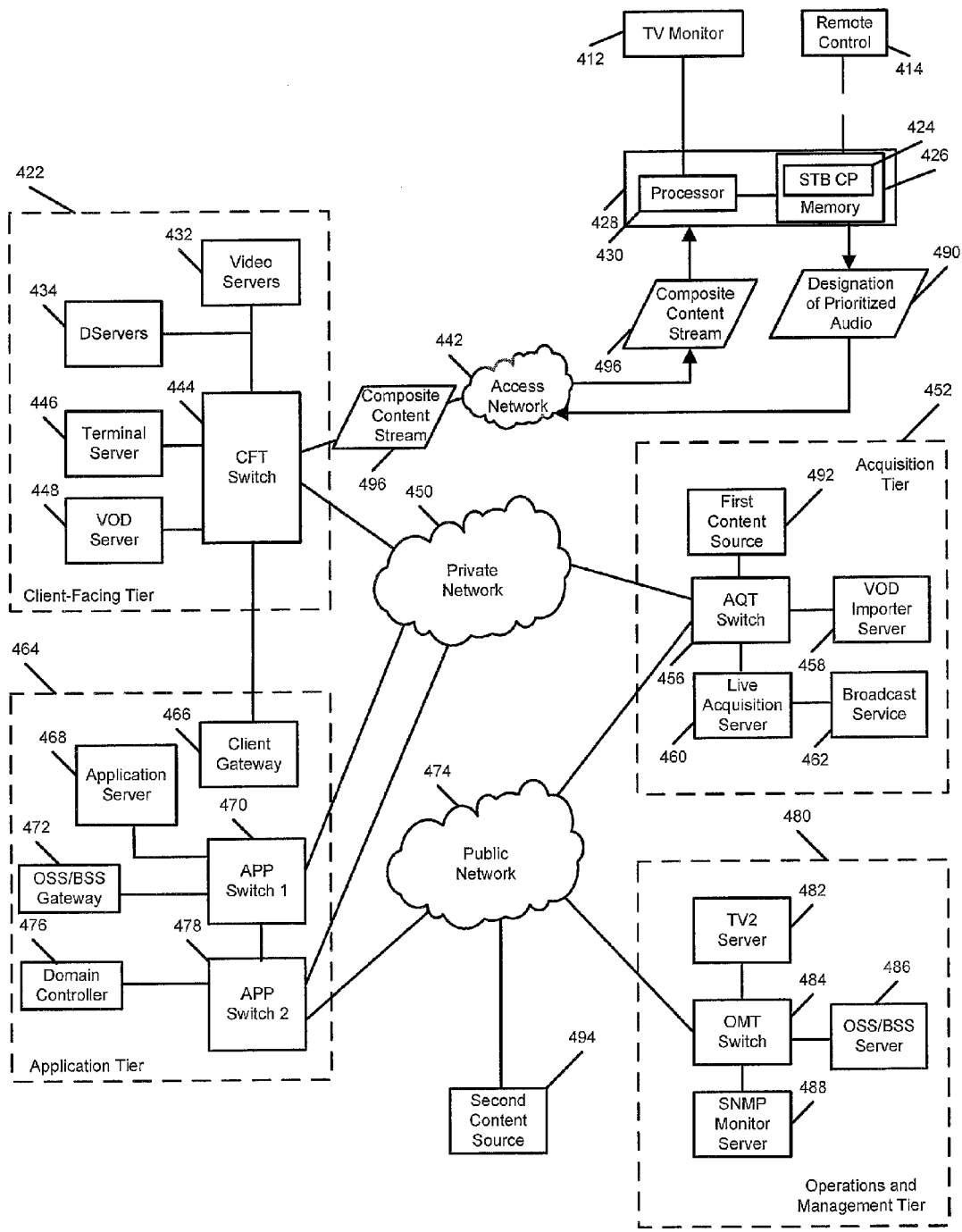
FIG. 4 is a diagram of a particular embodiment of an Internet protocol television (IPTV) system to transmit a prioritized audio stream along with multimedia content.

Referring to FIG. 4, a particular embodiment an IPTV system to transmit a prioritized audio stream along with multimedia content is illustrated and generally designated 400. The embodiment of FIG. 4 is included only for illustrative purposes and in no way represents a limiting embodiment of this invention. Readers will understand that the television service can be a cable television service, a satellite television service, or any other television service. Furthermore, the embodiment of FIG. 4 describes only one possible implementation of an IPTV television service and in no way represents a limiting embodiment for IPTV television services. Readers will understand that an IPTV television service can be embodied in many other ways within the scope of the present disclosure.

As shown, the system 400 includes a client facing tier 422, an application tier 464, an acquisition tier 452, and an operations and management tier 480. Each tier 422, 452, 464, and 480 can be coupled to a private network 450; to a public network 474, such as the Internet; to an access network 442; or to more than one of the private network 450, the public network 474, and the access network 442. For example, the client-facing tier 422 can be coupled to the private network 450 and to the access network 442. Further, the application tier 464 can be coupled to the private network 450 and to the public network 474. The acquisition tier 452 can also be coupled to the private network 450 and to the public network 474. Additionally, the operations and management tier 480 can be coupled to the public network 474.

As illustrated in FIG. 4, the various tiers 422, 452, 464, and 480 may communicate with each other via the private network 450, the public network 474, and the access network 442. For instance, the client-facing tier 422 can communicate with the application tier 464 and the acquisition tier 452 via the private network 450. The application tier 464 can communicate with the acquisition tier 452 via the private network 450. Further, the application tier 464 can communicate with the acquisition tier 452 and the operations and management tier 480 via the public network 474. Moreover, the acquisition tier 452 can communicate with the operations and management tier 480 via the public network 474. In a particular embodiment, elements of the application tier 464, including, but not limited to, a client gateway 466, can communicate directly with the client-facing tier 422.

The client-facing tier 422 may communicate with user equipment via an access network 422, such as an Internet Protocol Television (IPTV) access network. The client-facing tier 422 can communicate with a representative set-top box device 428 at a customer premise. In a particular embodiment, customer premises equipment (CPE) that facilitates communication with the set-top box device 428 includes routers, local area network devices, modems, such as digital subscriber line (DSL) modems, any other suitable devices for facilitating communication between a set-top box device and the access network 442, or any combination thereof.

In a particular embodiment, the client-facing tier 422 can be coupled to the CPE via fiber optic cables. Alternatively, the CPE can include digital subscriber line (DSL) modems that are coupled to one or more network nodes via twisted pairs, and the client-facing tier 422 can be coupled to the network nodes via fiber-optic cables. The set-top box device 428 can process data received via the access network 442, via a suitable IPTV software platform.

The set-top box device 428 can be coupled to an external display device, such as a television monitor 412. Moreover, the set-top box device 428 can communicate with a remote control 414. The set-top box device 428 can include IPTV set-top box devices as well as video gaming devices or consoles that are adapted to receive IPTV content. The set-top box device 428 can also include computers or other computing devices that are adapted to emulate set-top box device functionality and any other device adapted to receive IPTV content and transmit data to an IPTV system via an access network.

In an exemplary, non-limiting embodiment, the set-top box device 428 can send and receive data, video, or any combination thereof, from the client-facing tier 422 via the access network 442 and render or display the data, video, or any combination thereof, at the display device 412 to which it is coupled. For example, the set-top box device 428 may send a designation of prioritized audio 490 to the client-facing tier 422. As another example, the set-top box device 428 may include tuners that receive and decode television programming signals including a composite content stream 496 prior to transmission of signals to the display device 412. Further, the set-top box device 428 can include a STB processor 430 and a STB memory device 426 that is accessible to the STB processor 430. In one embodiment, a computer program, such as the STB computer program 424, can be embedded within the STB memory device 426. In another illustrative embodiment, a user computing device, such as a personal computer, laptop or local server, can be coupled to the set-top box device 428, for example, via a universal serial bus (USB) connection, Ethernet connection, wireless connection, or other connection.

In an illustrative embodiment, the client-facing tier 422 can include a client-facing tier (CFT) switch 444 that manages communication between the client-facing tier 422 and the access network 442 and between the client-facing tier 422 and the private network 450. As illustrated, the CFT switch 444 is coupled to one or more data servers, such as D-servers 434, that store, format, encode, replicate, or otherwise manipulate or prepare video content for communication from the client-facing tier 422 to the set-top box device 428. The CFT switch 444 can also be coupled to a terminal server 446 that provides terminal devices with a connection point to the private network 450. In a particular embodiment, the CFT switch 444 can be coupled to a video-on-demand (VOD) server 448 that stores or provides VOD content imported by the IPTV system 400.

Further, the CFT switch 444 is coupled to one or more video servers 432 that receive video content and transmit the content to the set-top box 428 via the access network 442. In a particular embodiment, the CFT switch 444 can be coupled to one or more publication servers that facilitate the formation of groups that share private content and the inclusion of indicators of such private content with video content received by users in a group.

In an illustrative embodiment, the client-facing tier 422 can communicate with a large number of set-top boxes, such as the representative set-top box 428 over a wide geographic area, such as a regional area, a metropolitan area, a viewing area, a designated market area or any other suitable geographic area, market area, or subscriber or customer group that can be supported by networking the client-facing tier 422 to numerous set-top box devices. In a particular embodiment, the CFT switch 444, or any portion thereof, can include a multicast router or switch that feeds one or more video streams from a video server to multiple set-top box devices.

As illustrated in FIG. 4, the application tier 464 can communicate with both the private network 450 and the public network 474. The application tier 464 can include a first application tier (APP) switch 470 and a second APP switch 478. In a particular embodiment, the first APP switch 470 can be coupled to the second APP switch 478. The first APP switch 470 can be coupled to an application server 468 and to an OSS/BSS gateway 472. In a particular embodiment, the application server 468 can provide applications to the set-top box device 428 via the access network 442, which enable the set-top box device 428 to provide functions, such as display, messaging, processing of IPTV data and VOD material, etc. In a particular embodiment, the OSS/BSS gateway 472 includes operation systems and support (OSS) data, as well as billing systems and support (BSS) data. In one embodiment, the OSS/BSS gateway 472 can provide or restrict access to an OSS/BSS server 486 that stores operations and billing systems data.

The second APP switch 478 can be coupled to a domain controller 476 that provides Internet access, for example, to users at their computers 490 via the public network 474. For example, the domain controller 476 can provide remote Internet access to IPTV account information, e-mail, personalized Internet services, or other online services via the public network 474. In addition, the second APP switch 478 can be coupled to a subscriber and system store that includes account information, such as account information that is associated with users who access the IPTV system 400 via the private network 450 or the public network 474. In an illustrative embodiment, the subscriber and system store can store subscriber or customer data and create subscriber or customer profiles that are associated with IP addresses of corresponding set-top box device 428.

In a particular embodiment, the application tier 464 can include a client gateway 466 that communicates data directly to the client-facing tier 422. The client gateway 466 may be coupled directly to the CFT switch 444. The client gateway 466 can provide user access to the private network 450 and the tiers coupled thereto. In an illustrative embodiment, the set-top box device 428 can access the IPTV system 400 via the access network 442, using information received from the client gateway 466. User devices can access the client gateway 466 via the access network 442, and the client gateway 466 can allow such devices to access the private network 450 once the devices are authenticated or verified. Similarly, the client gateway 466 can prevent unauthorized devices, such as hacker computers or stolen set-top box devices from accessing the private network 450, by denying access to these devices beyond the access network 442.

For example, when the representative set-top box device 428 accesses the client-facing tier 422 via the access network 442, the client gateway 466 can verify subscriber information by communicating with the subscriber and system store via the private network 450. Further, the client gateway 466 can verify billing information and status by communicating with the OSS/BSS gateway 472 via the private network 450. In one embodiment, the OSS/BSS gateway 472 can transmit a query via the public network 474 to the OSS/BSS server 486. After the client gateway 466 confirms subscriber and/or billing information, the client gateway 466 can allow the set-top box device 428 to access IPTV content and VOD content at the client-facing tier 422. If the client gateway 466 cannot verify subscriber information for the set-top box device 428, e.g., because it is connected to an unauthorized twisted pair or other connection, the client gateway 466 can block transmissions to and from the set-top box device 428 beyond the access network 442.

As indicated in FIG. 4, the acquisition tier 452 can include an acquisition tier (AQT) switch 456 that communicates with the private network 450. The AQT switch 456 can also communicate with the operations and management tier 480 via the public network 474. In a particular embodiment, the AQT switch 456 can be coupled to a live acquisition server 460 that receives or acquires television content, movie content, advertisement content, other video content, or any combination thereof, from a broadcast service 462 and a first content source 492, such as a satellite acquisition system or satellite head-end office. For example, the first content source 492 may provide a live television broadcast of an automobile racing event. The live acquisition server 460 may also receive or acquire a prioritized audio stream from a second content source 494 via the public network 474. For example, the second content source 494 may provide in-car audio commentary from particular drivers participating in the automobile racing event. In a particular embodiment, the live acquisition server 460 can transmit content to the AQT switch 456, and the AQT switch 456 can transmit the content to the CFT switch 444 via the private network 450.

In an illustrative embodiment, content can be transmitted to the D-servers 434, where it can be encoded, formatted, stored, replicated, or otherwise manipulated and prepared for communication from the video server(s) 432 to the set-top box device 428. The CFT switch 444 can receive content from the video server(s) 432 and communicate the content to the set-top box device 428. The set-top box device 428 may then in turn transmit the content to the television monitor 412. In an illustrative embodiment, video or audio portions of the content can be streamed to the set-top box device 428.

Further, the AQT switch 456 can be coupled to a video-on-demand importer server 458 that receives and stores television or movie content received at the acquisition tier 452 and communicates the stored content to the VOD server 448 at the client-facing tier 422 via the private network 450. Additionally, at the acquisition tier 452, the video-on-demand (VOD) importer server 458 can receive content from one or more VOD sources outside the IPTV system 400, such as movie studios and programmers of non-live content. For example, the first content source 140 of FIG. 1 may be an external VOD source. The VOD importer server 458 can transmit the VOD content to the AQT switch 456, and the AQT switch 456, in turn, can communicate the material to the CFT switch 444 via the private network 450. The VOD content can be stored at one or more servers, such as the VOD server 448.

When users issue requests for VOD content via the set-top box device 428 or the order processing module 420, the requests can be transmitted over the access network 442 to the VOD server 448, via the CFT switch 444. Upon receiving such requests, the VOD server 448 can retrieve the requested VOD content and transmit the content to the set-top box device 428 across the access network 442, via the CFT switch 444. The set-top box device 428 can transmit the VOD content to the television monitor 412. In an illustrative embodiment, video or audio portions of VOD content can be streamed to the set-top box device 428.

FIG. 4 further illustrates that the operations and management tier 480 can include an operations and management tier (OMT) switch 484 that conducts communication between the operations and management tier 480 and the public network 474. In the embodiment illustrated by FIG. 4, the OMT switch 484 is coupled to a TV2 server 482. Additionally, the OMT switch 484 can be coupled to an OSS/BSS server 486 and to a simple network management protocol (SNMP) monitor 488 that monitors network devices within or coupled to the IPTV system 400. In a particular embodiment, the OMT switch 484 can communicate with the AQT switch 456 via the public network 474.

In an illustrative embodiment, the live acquisition server 460 can transmit content to the AQT switch 456, and the AQT switch 456, in turn, can transmit the content to the OMT switch 484 via the public network 474. In this embodiment, the OMT switch 484 can transmit the content to the TV2 server 482 for display to users accessing the user interface at the TV2 server 482. For example, a user can access the TV2 server 482 using a personal computer (PC) 490 coupled to the public network 474.

Figure 5:
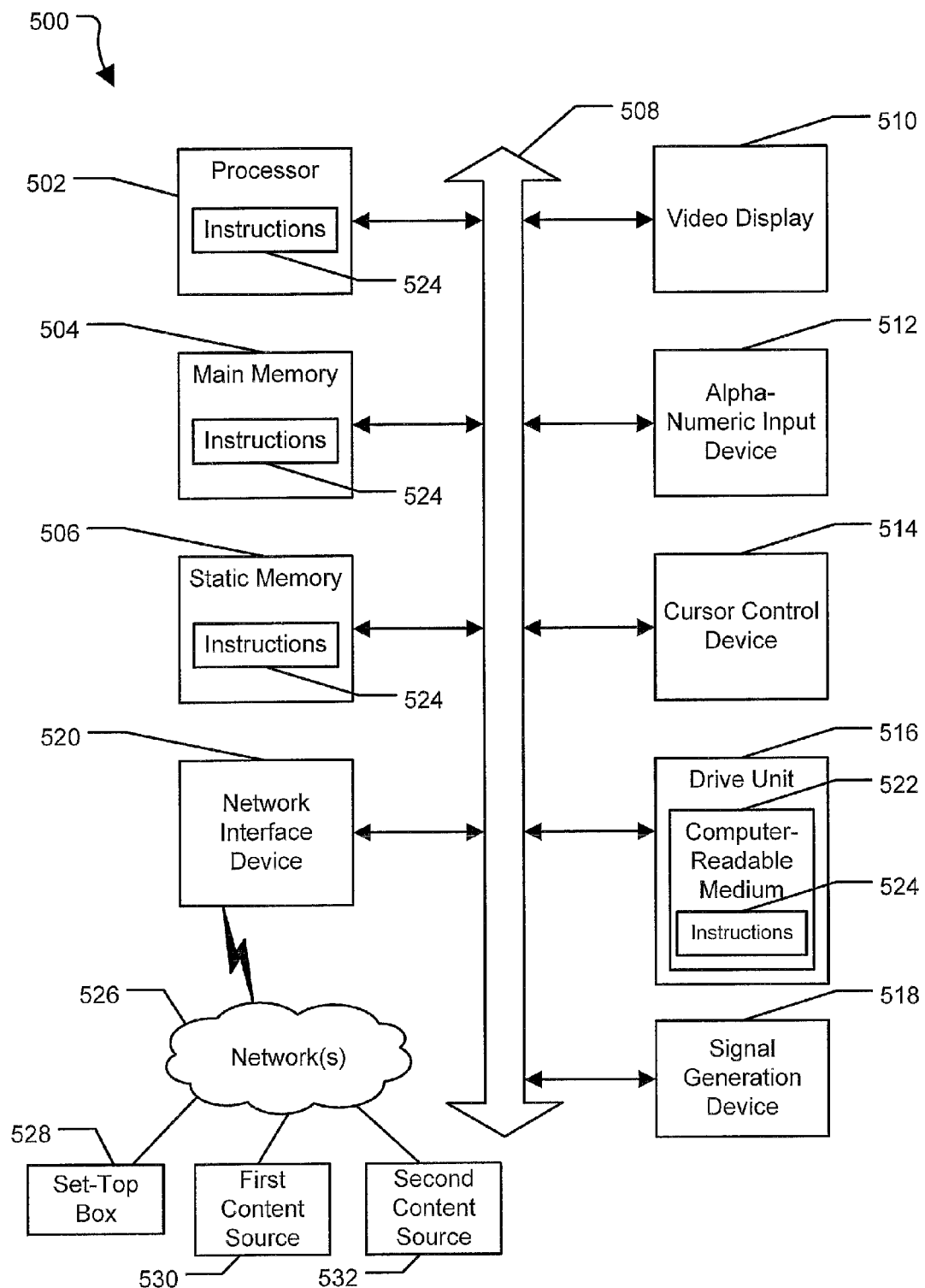
FIG. 5 is a block diagram of a particular embodiment of a general purpose computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 may include or be included within any one or more of the STB 110, the server 130, the first content source 140, and the second content source 160 discussed with reference to FIGS. 1-4.

In a networked deployment, the computer system 500 may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a pager, a personal trusted device, a web appliance, or any other machine capable, of executing a set of instructions (sequential or otherwise) that specify actions to be taken by that machine. In a particular embodiment, the computer system 500 can be implemented using electronic devices that provide voice, video, or data communication. For example, the computer system 500 may be included within a portable device (e.g., a wireless telephone or smartphone) configured to receive a composite content stream from a server (e.g., the server 130 of FIG. 1) via a mobile network. The portable device may output signals based on the composite content stream at a display and at one or more speakers of the portable device. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, or a solid state display. Additionally, the computer system 500 may include an input device 512, such as a keyboard, and a cursor control device 514, such as a mouse. When the computer system 500 is included in a STB (e.g., the STB 110 of FIG. 1), the computer system 500 may include a remote control (e.g., the remote control 104 of FIG. 1) but not a keyboard or mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524, so that a device connected to one or more networks 526 (e.g., the network 120 and the Internet 150 of FIG. 1) can communicate voice, video or data over the one or more networks 526. Further, the instructions 524 may be transmitted or received over the one or more networks 526 via the network interface device 520. The computer system 500 may be a server that is operable to communicate with a set-top box 528, a first content source 530, and a second content source 532 via the one or more networks 526. In an illustrative embodiment, the set-top box 528 is the STB 110 of FIG. 1, the first content source 530 is the first content source 140 of FIG. 1, and the second content source 532 is the second content source 160 of FIG. 1.

While the computer-readable medium 522 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. Such standards are periodically superseded by faster or more efficient equivalents having essentially the same functions. Accordingly, replacement standards and protocols having the same or similar functions as those disclosed herein are considered equivalents thereof. For example, such standards may include Ethernet, USB, and Home PNA (HPNA).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, at a server, a request for media content from a media device, wherein the request identifies a video stream of multimedia content and a first audio stream, the video stream available from a first content source and the first audio stream available from a second content source distinct from the first content source;
   generating, at the server, a composite stream that corresponds to the media content, wherein the composite stream includes a first packet and a second packet, the first packet including first data from the first content source, the first data associated with the video stream and a native audio stream of the multimedia content, and the second packet including second data from the second content source, the second data associated with the first audio stream; and
   initiating, from the server, a transmission of the composite stream to the media device.

2. The method of claim 1, wherein generating the composite stream comprises:
   generating first packets of multimedia content, the multimedia content including the video stream and the native audio stream;
   generating second packets of the first audio stream; and
   interleaving the first packets and the second packets to generate the composite stream.

3. The method of claim 1, further comprising:
   receiving, at the server, the multimedia content from the first content source, the multimedia content including the video stream and the native audio stream; and
   receiving, at the server, the first audio stream from the second content source.

4. The method of claim 3, wherein the multimedia content includes first packets and the first audio stream includes second packets, and wherein generating the composite stream comprises:
   time synchronizing the multimedia content and the first audio stream; and
   after time synchronizing the multimedia content and the first audio stream, interspersing the second packets among the first packets to generate the composite stream that includes the first packets and the second packets.

5. The method of claim 1, wherein the composite stream is transmitted as broadcast content.

6. The method of claim 1, wherein the media device comprises a media playback device.

7. The method of claim 1, further comprising:
   receiving an authorization token at the server from the media device; and
   transmitting the authorization token to the second content source, wherein the first audio stream is received after transmitting the authorization token to the second content source.

8. The method of claim 7, wherein the authorization token indicates that the media device has subscribed to a service associated with the second content source, and wherein the authorization token enables access to the first audio stream.

9. The method of claim 1, wherein the first content source comprises a television programming source, wherein the second content source includes an internet radio source, and wherein each of the first content source and the second content source is external to the server.

10. The method of claim 1, wherein the first audio stream is of higher quality than the native audio stream, is in a different language than the native audio stream, or any combination thereof.

11. The method of claim 1, wherein the native audio stream includes first audio in a first language, wherein the first audio stream includes second audio in a second language, and wherein the first language is distinct from the second language.

12. The method of claim 1, wherein the first audio stream includes audio in surround sound corresponding to the video stream.

13. The method of claim 1, wherein the first content source includes syndicated television programming, live television programming, movie programming, video on demand programming, or any combination thereof.

14. The method of claim 1, wherein the server is an internet protocol television server, and wherein the composite stream is an internet protocol television stream.

15. A device comprising:
   a processor configured to:
      receive a request for media content from a media device, wherein the request identifies a video stream of multimedia content and a first audio stream, the video stream available from a first content source and the first audio stream available from a second content source distinct from the first content source; and
      generate a composite stream that corresponds to the media content, wherein the composite stream includes a first packet and a second packet, the first packet including first data from the first content source, the first data associated with the video stream and a native audio stream of the multimedia content, and the second packet including second data from the second content source, the second data associated with the first audio stream; and a network interface configured to send a transmission of the composite stream to the media device.

16. The device of claim 15, wherein, to generate the composite stream, the processor is configured to synchronize the first audio stream with the multimedia content and to replace the native audio stream with the first audio stream.

17. The device of claim 16, wherein, to synchronize the first audio stream with the multimedia content, the processor is configured to introduce a delay to the multimedia content.

18. The device of claim 16, wherein, to synchronize the first audio stream with the multimedia content, the processor is configured to introduce a delay to the first audio stream.

19. A computer-readable hardware device comprising instructions, that when executed by a processor, cause the processor to perform operations comprising:

receiving a request for media content from a media device, wherein the request identifies a video stream of multimedia content and a first audio stream, the video stream available from a first content source and the first audio stream available from a second content source distinct from the first content source;

generating a composite stream that corresponds to the media content, wherein the composite stream includes a first packet and a second packet, the first packet including first data from the first content source, the first data associated with the video stream and a native audio stream of the multimedia content, and the second packet including second data from the second content source, the second data associated with the first audio stream; and initiating a transmission of the composite stream to the media device.

20. The computer-readable hardware device of claim 19, wherein the operations further comprise time synchronizing the multimedia content and the first audio stream by introducing a delay to the first audio stream.

* * * * *